(12) United States Patent
Luh (10) Patent No.: US 6,772,864 B1
(45) Date of Patent: Aug. 10, 2004

(54) MOTORIZED CYCLE HAVING INDEPENDENT BRAKE SYSTEM

(76) Inventor: Tai-Yang Luh, 532, Sec. 1, Chang Long Rd., Tai Ping City, Taichung Hsien (TW)

( * ) Notice: Subject to any disclaimer, the term of this patent is extended or adjusted under 35 U.S.C. 154(b) by 0 days.

(21) Appl. No.: 10/461,287

(22) Filed: Jun. 13, 2003

(51) Int. Cl.[7] ............................ F16D 65/14; B60K 17/34
(52) U.S. Cl. ................... 188/152; 180/244; 188/106 R
(58) Field of Search ........................... 180/68.1, 68.4, 180/90.6, 244; 188/106 R, 106 P, 151 R, 152, 344, 358, 359, 360

(56) References Cited

U.S. PATENT DOCUMENTS 6,478,103 B1 * 11/2002 Matsuura .................. 180/90.6

* cited by examiner

Primary Examiner—Chris Schwartz
(74) Attorney, Agent, or Firm—Charles E. Baxley (57) ABSTRACT

A motorized cycle includes a base board, a brake crank, a first operation member, a first drive plate, two front brake wires, an oil pump, a second operation member, a second drive plate, and a rear brake wire. Thus, the two rear wheels are braked independently, and the four wheels are braked synchronously.

13 Claims, 10 Drawing Sheets

MOTORIZED CYCLE HAVING INDEPENDENT BRAKE SYSTEM

BACKGROUND OF THE INVENTION

1. Field of the Invention

The present invention relates to a motorized cycle having an independent brake system, and more particularly to a motorized cycle, wherein the two rear wheels are braked independently, and the four wheels are braked synchronously.

2. Description of the Related Art

Figure 1:
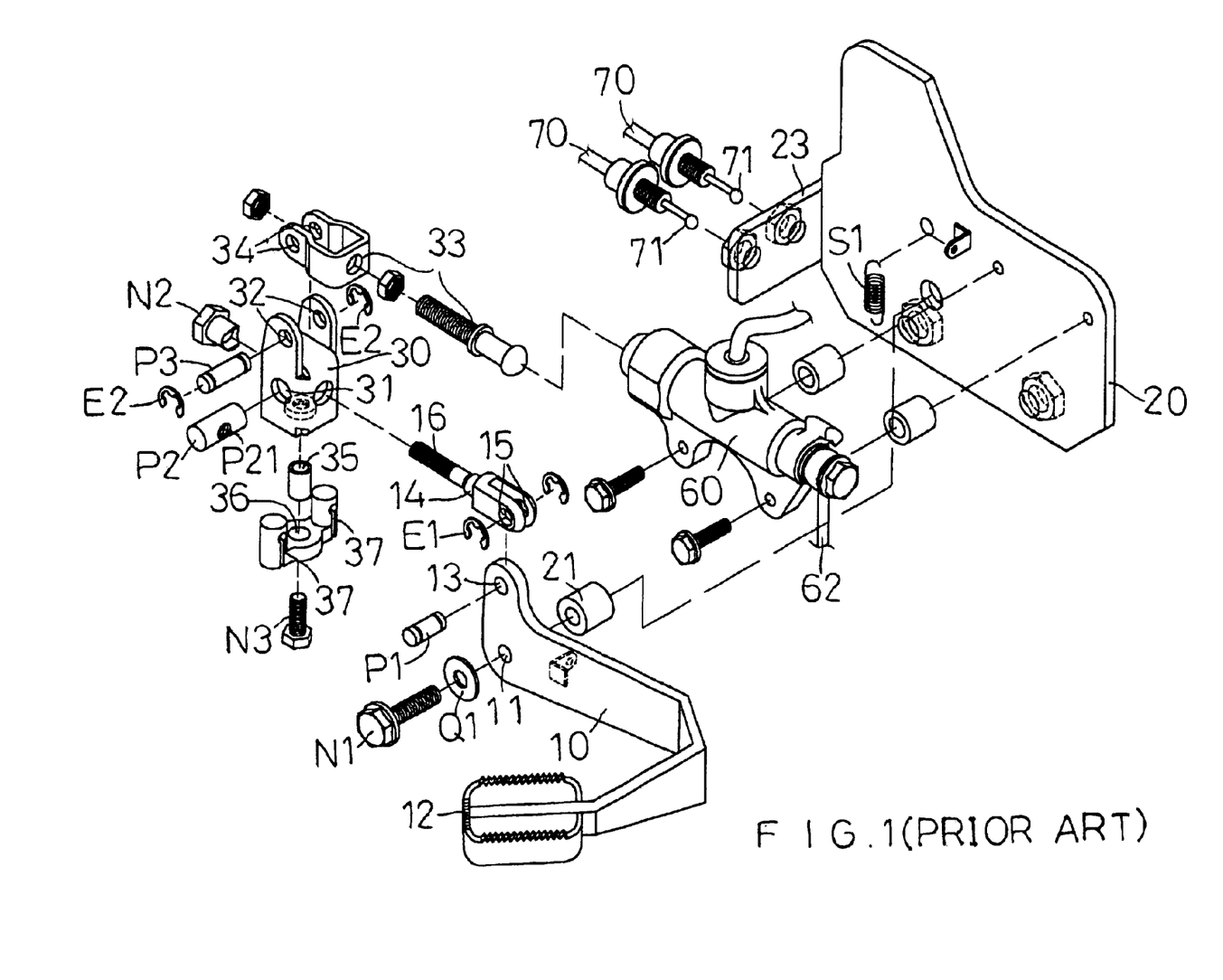
FIG. 1 is an exploded perspective view of a conventional motorized cycle in accordance with the prior art.
Figure 2:
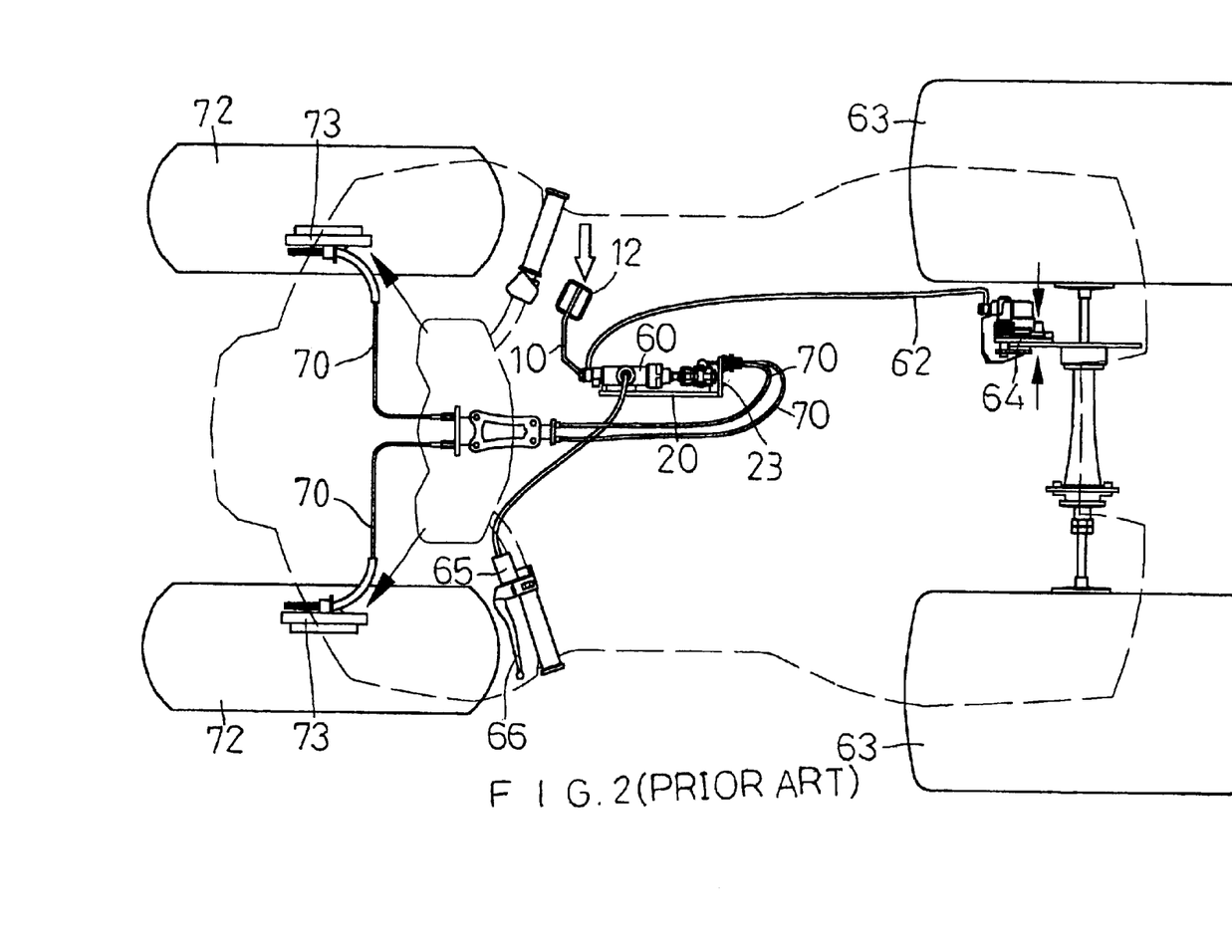
FIG. 2 is a top plan assembly view of the conventional motorized cycle in accordance with the prior art.
Figure 3:
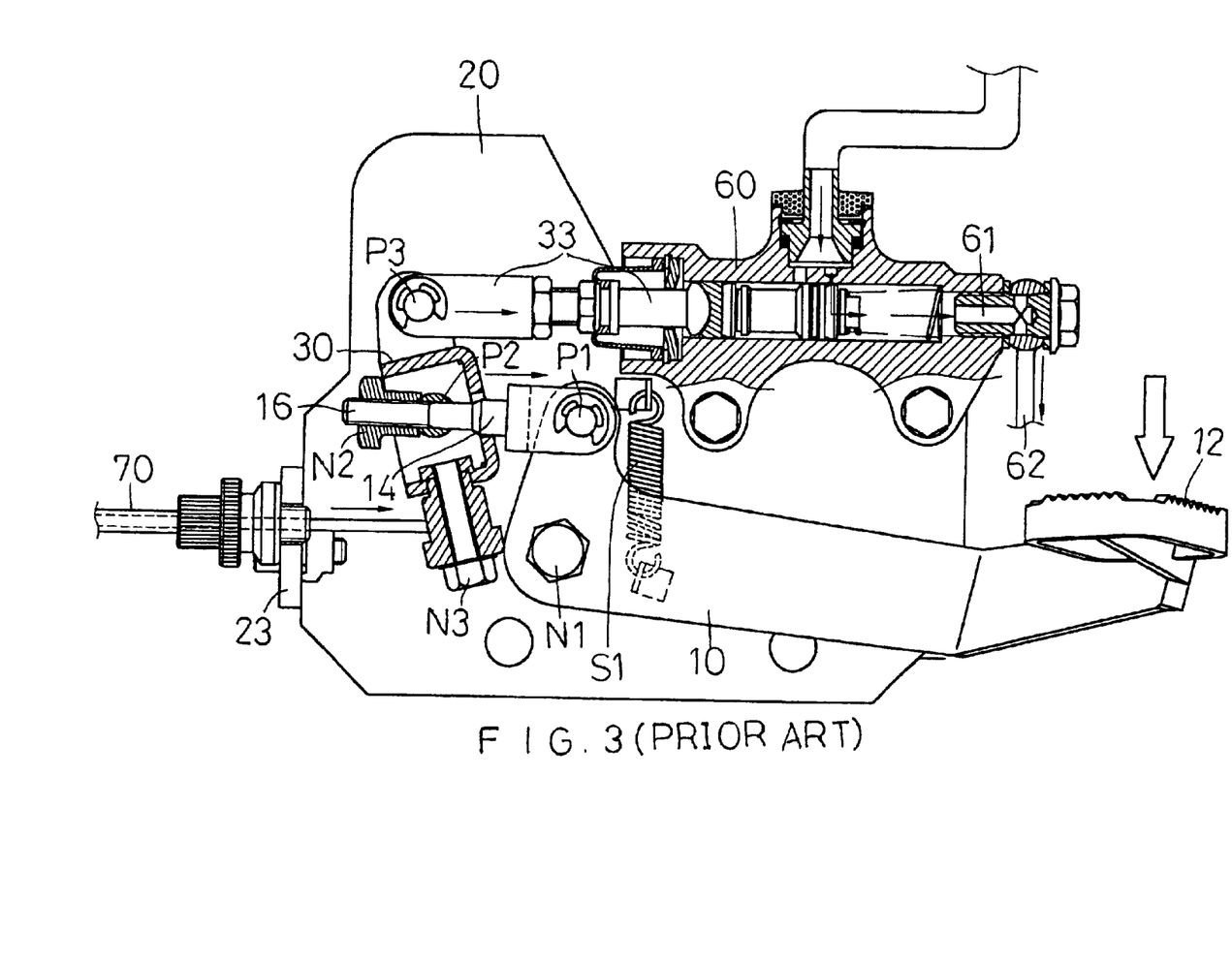
FIG. 3 is a side plan cross-sectional assembly operational view of the conventional motorized cycle in accordance with the prior art.

A conventional motorized cycle in accordance with the prior art shown in FIGS. 1–3 comprises a base board 20, a brake crank 10, an elastic member S1, a first operation member 14, a first drive plate 30, a second operation member 33, and an oil pump 60.

The base board 20 is provided with a first pivot post 21. A first locking plate 23 is mounted on an end of the base board 20.

The brake crank 10 is substantially L-shaped and has a first end provided with a pedal 12 and a second end formed with a pivot hole 13. The brake crank 10 has a mediate portion formed with a pivot hole 11 pivotally mounted on the first pivot post 21 of the base board 20 and locked on an outer end of the first pivot post 21 of the base board 20 by pivot members including a bolt N1 and a washer Q1.

The elastic member S1 (such as a tensile spring) is mounted between the brake crank 10 and the base board 20 and has a first end secured on the mediate portion of the brake crank 10 and a second end secured on the base board 20, so that the brake crank 10 can be returned to the original position by the restoring force of the elastic member S1.

The first operation member 14 has a fork-shaped first end pivotally mounted on the second end of the brake crank 10 and formed with two pivot holes 15 pivotally mounted on the pivot hole 13 of the second end of the brake crank 10 by pivot members including a pin P1 and two E-shaped snap rings E1. The first operation member 14 has a second end formed with a threaded rod 16.

The first drive plate 30 is pivotally mounted on the first operation member 14 and has a mediate portion formed with a pivot hole 31. A shaft P2 is pivotally mounted in the pivot hole 31 of the first drive plate 30 and has a mediate portion formed with a through hole P21 for passage of the threaded rod 16 of the first operation member 14. A nut N2 is screwed on the threaded rod 16 of the first operation member 14 and rested on the shaft P2. The first drive plate 30 has a fork-shaped first end formed with two pivot holes 32. The first drive plate 30 has a second end provided with a support shaft 35.

The motorized cycle further comprises a front brake seat 36 pivotally mounted on the support shaft 35 of the first drive plate 30 by a bolt N3 and provided with two retaining slots 37.

The motorized cycle further comprises two front brakes 73 (such as mechanical brakes) each mounted on a front wheel 72, and two front brake wires 70 each having a first end connected to a respective one of the two front brakes 73 and a second end extended through the first locking plate 23 and formed with a locking head 71 locked in a respective one of the two retaining slots 37 of the front brake seat 36.

The second operation member 33 is pivotally mounted on the first drive plate 30 and has a fork-shaped first end formed with two pivot holes 34 pivotally mounted on the pivot holes 32 of the first end of the first drive plate 30 by pivot members including a pin P3 and two E-shaped snap rings E2.

The oil pump 60 is mounted on the base board 20. The second operation member 33 has a second end mounted in a first end of the oil pump 60 to start an oil channel 61. The oil pump 60 has a second end provided with a brake oil pipe 62 which is extended to a hydraulic disk brake 64 of a rear wheel 63. In addition, the hydraulic disk brake 64 of the rear wheel 63 is connected to a left handlebar 66 through the brake oil pipe 62, the oil pump 60 and a brake oil pump 65 (see FIG. 2).

As shown in FIG. 2, under the normal braking operation, the left handlebar 66 is pressed by the driver, so that the brake oil pump 65 and the brake oil pipe 62 can control the hydraulic disk brake 64 so as to brake the rear wheels 63.

As shown in FIGS. 1–3, under the emergency braking operation, the pedal 12 of the brake crank 10 is stepped by the driver to move the first operation member 14 which drives the first drive plate 30 and the second operation member 33 to move in the same direction, so as to control the two front brakes 73 to brake the two front wheels 72 and to control the hydraulic disk brake 64 to brake the rear wheels 63, so that the four wheels can be braked synchronously.

However, the conventional motorized cycle has to provide an oil pump 60 on the base board 20 and to provide a brake oil pump 65 on the left handlebar 66, so that the four wheels can be braked synchronously, thereby increasing costs of fabrication.

SUMMARY OF THE INVENTION

The primary objective of the present invention is to provide a motorized cycle, wherein the two rear wheels are braked independently, and the four wheels are braked synchronously.

Another objective of the present invention is to provide a motorized cycle, wherein the left handlebar can be used to control the second drive plate and the second operation member so as to achieve the braking effect, without having to provide a brake oil pump on the left handlebar, so that the motorized cycle only needs an oil pump to achieve the braking effect, thereby decreasing costs of fabrication.

In accordance with the present invention, there is provided a motorized cycle, comprising:

a base board provided with a first pivot post and a second pivot post;

a brake crank having a mediate portion pivotally mounted on the first pivot post of the base board;

a first operation member pivotally mounted on the brake crank;

a first drive plate pivotally mounted on the first operation member;

two front brake wires each having a first end connected to a front brake and a second end secured on the first drive plate;

an oil pump mounted on the base board and having a first end and a second end;

the second end of the oil pump being provided with a brake oil pipe which is extended to a hydraulic disk brake of a rear wheel;

a second operation member having a first end pivotally mounted on the first drive plate and a second end mounted in the first end of the oil pump to open and close an oil path of the oil pump;

a second drive plate combined with the first drive plate and the second operation member and having a first end pivotally connected with the second operation member and the first drive plate;

the second drive plate having a mediate portion pivotally mounted on the second pivot post of the base board; and a rear brake wire having a first end connected to a handlebar and a second end locked on a second end of the second drive plate.

Further benefits and advantages of the present invention will become apparent after a careful reading of the detailed description with appropriate reference to the accompanying drawings.

DETAILED DESCRIPTION OF THE INVENTION

Figure 4:
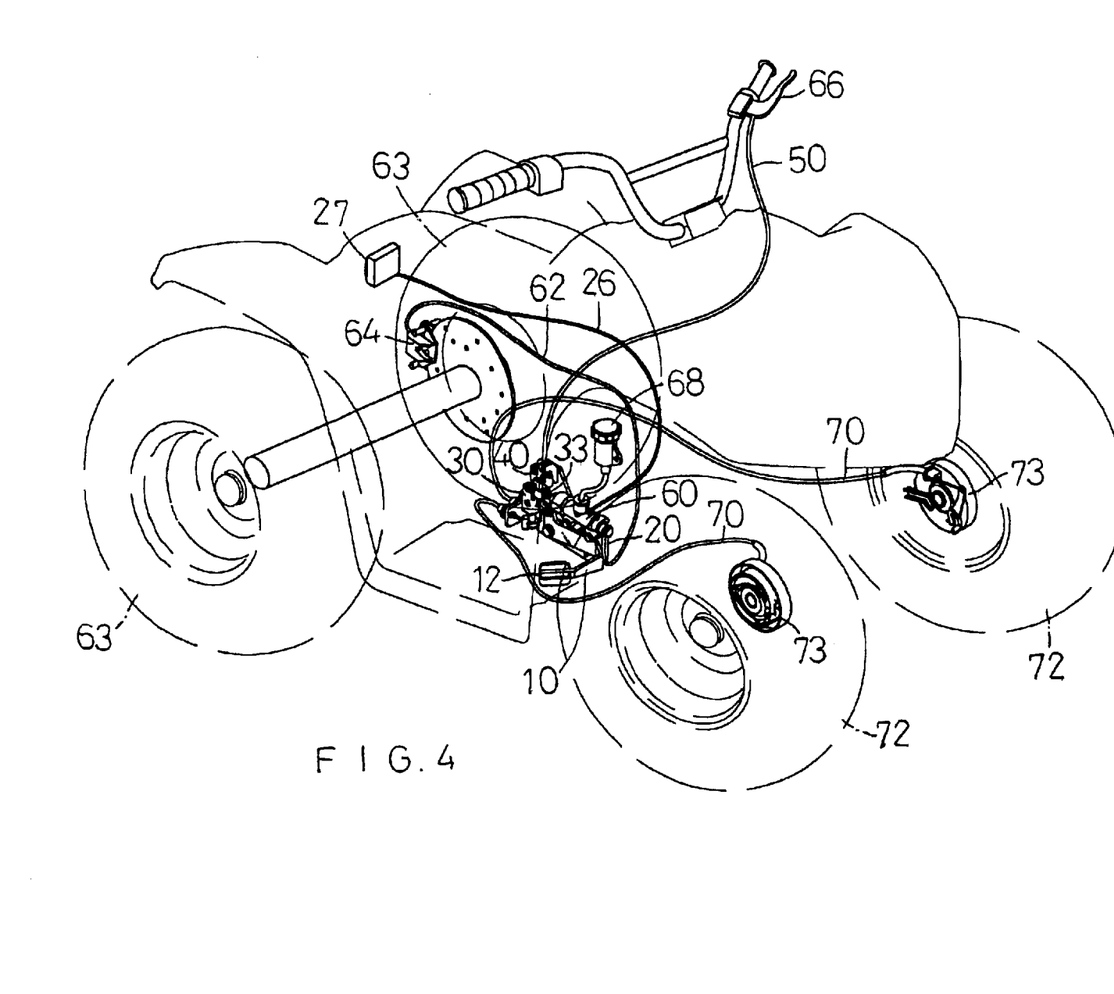
FIG. 4 is a perspective view of a motorized cycle in accordance with the preferred embodiment of the present invention.
Figure 5:
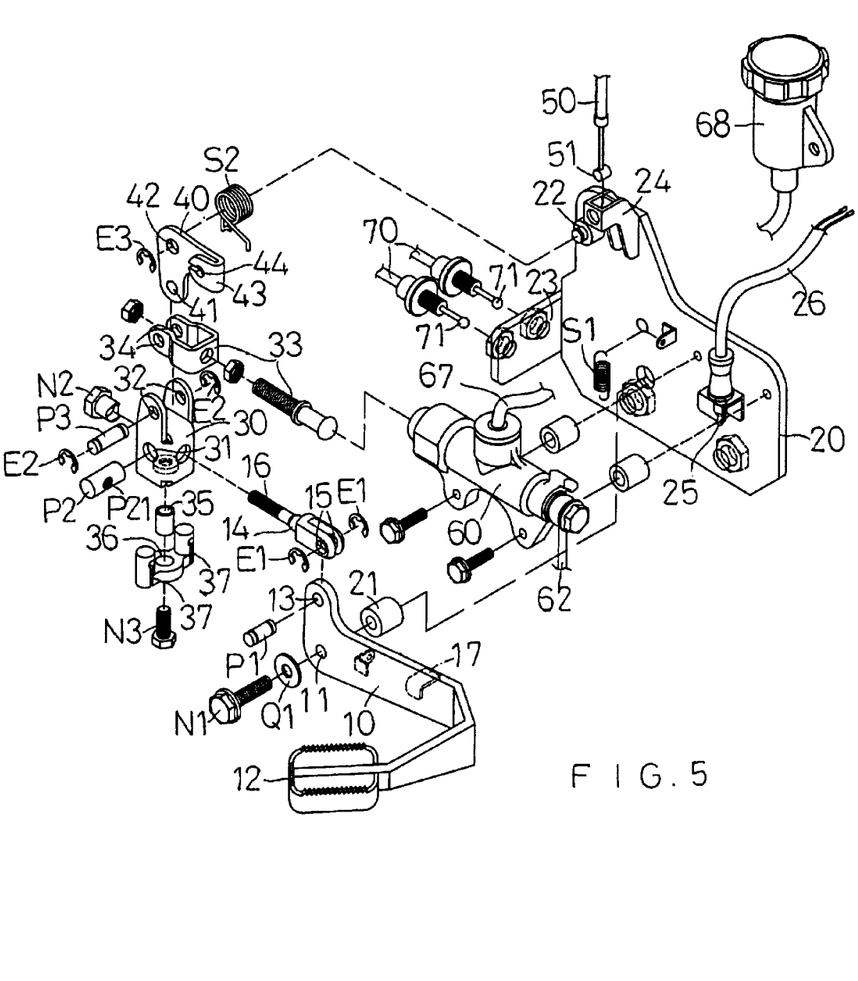
FIG. 5 is an exploded perspective view of the motorized cycle in accordance with the preferred embodiment of the present invention.
Figure 6:
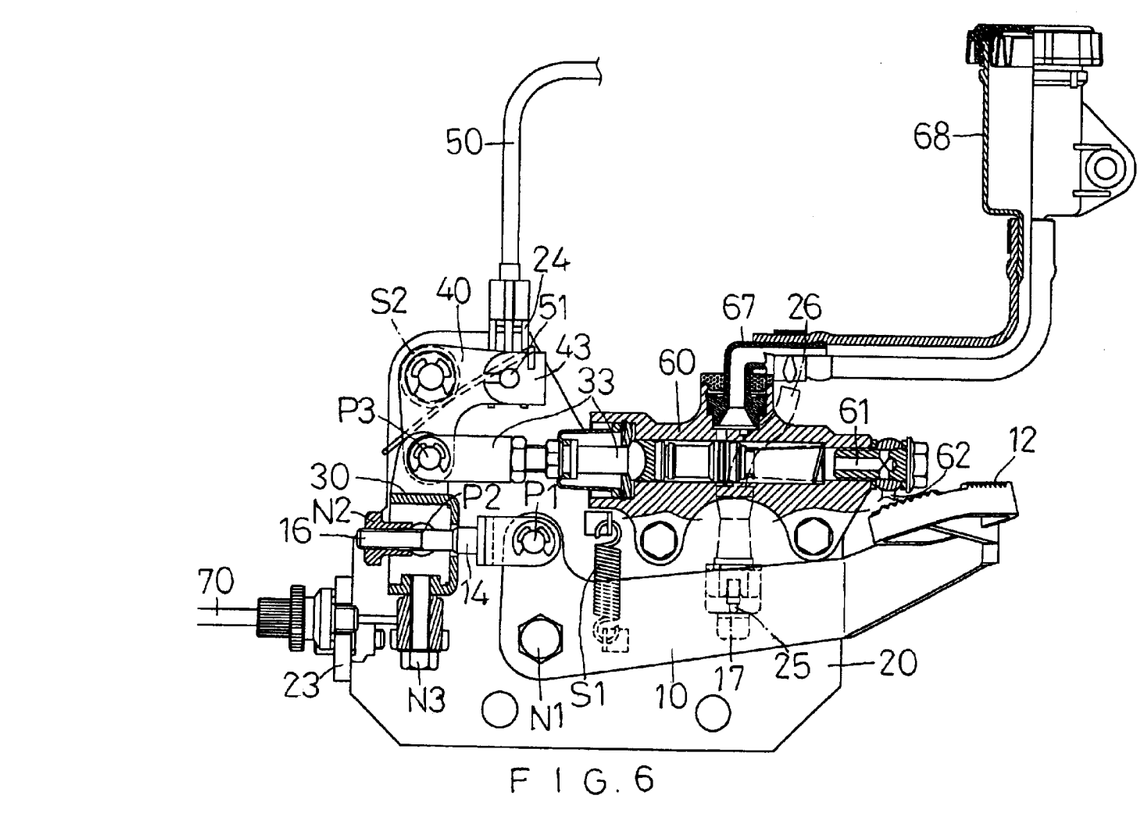
FIG. 6 is a side plan cross-sectional assembly view of the motorized cycle in accordance with the preferred embodiment of the present invention.

Referring to the drawings and initially to FIGS. 4–6, a motorized cycle in accordance with the preferred embodiment of the present invention is used on the beach or the like. The primary components of the motorized cycle of the present invention are the same as that of the conventional motorized cycle as shown in FIGS. 1–3, and the same elements are indicated by the same reference numbers. Thus, the same structure will not be further described in detail, and the primary features are described as follows.

The base board 20 is further provided with a second pivot post 22 and a second locking plate 2.

The motorized cycle further comprises a second drive plate 40 combined with the first drive plate 30 and the second operation member 33. The second drive plate 40 is substantially L-shaped and has a first end formed with a pivot hole 41 pivotally connected with the two pivot holes 34 of the second operation member 33 and the pivot holes 32 of the first end of the first drive plate 30 by the pivot members including a pin P3 and two E-shaped snap rings E2. The second drive plate 40 has a second end provided with a hook portion 43 formed with a hook hole 44.

The motorized cycle further comprises a rear brake wire 50 having a first end connected to the left handlebar 66 and a second end extended through the second locking plate 24 of the base board 20 and provided with a locking head 51 locked in the hook hole 44 of the second drive plate 40. Thus, when the left handlebar 66 is pressed, the second drive plate 40 and the second operation member 33 are driven and moved by the rear brake wire 50.

The oil pump 60 is mounted on the base board 20. The second operation member 33 has a second end mounted in a first end of the oil pump 60 to start an oil channel 61. The oil pump 60 has a mediate portion provided with an oil pipe 67 which is connected to a hydraulic cylinder 68. The oil pump 60 has a second end provided with a brake oil pipe 62 which is extended to a hydraulic disk brake 64 of the rear wheel 63.

The second drive plate 40 has a mediate portion formed with a pivot hole 42 pivotally mounted on the second pivot post 22 of the base board 20.

The motorized cycle further comprises a E-shaped snap ring E3 snapped on an outer end of the second pivot post 22 of the base board 20 and rested on the mediate portion of the second drive plate 40.

The motorized cycle further comprises a restoring member S2 (such as a torsion spring) mounted on the second pivot post .22 of the base board 20 and having a first end secured on the second drive plate 40 and a second end secured on the base board 20, so that the second drive plate 40 can be returned to the original position by the restoring force of the restoring member S2.

The base board 20 is provided with a microswitch 25 which is connected to an electric wire 26 which is connected to a rear brake lamp 27. In addition, the mediate portion of the brake crank 10 is provided with a press plate 17 that can be moved to touch the microswitch 25 of the base board 20. Thus, when the pedal 12 of the brake crank 10 is stepped by the driver, the press plate 17 of the brake crank 10 is moved to touch the microswitch 25 of the base board 20 to connect and light the rear brake lamp 27.

Figure 7:
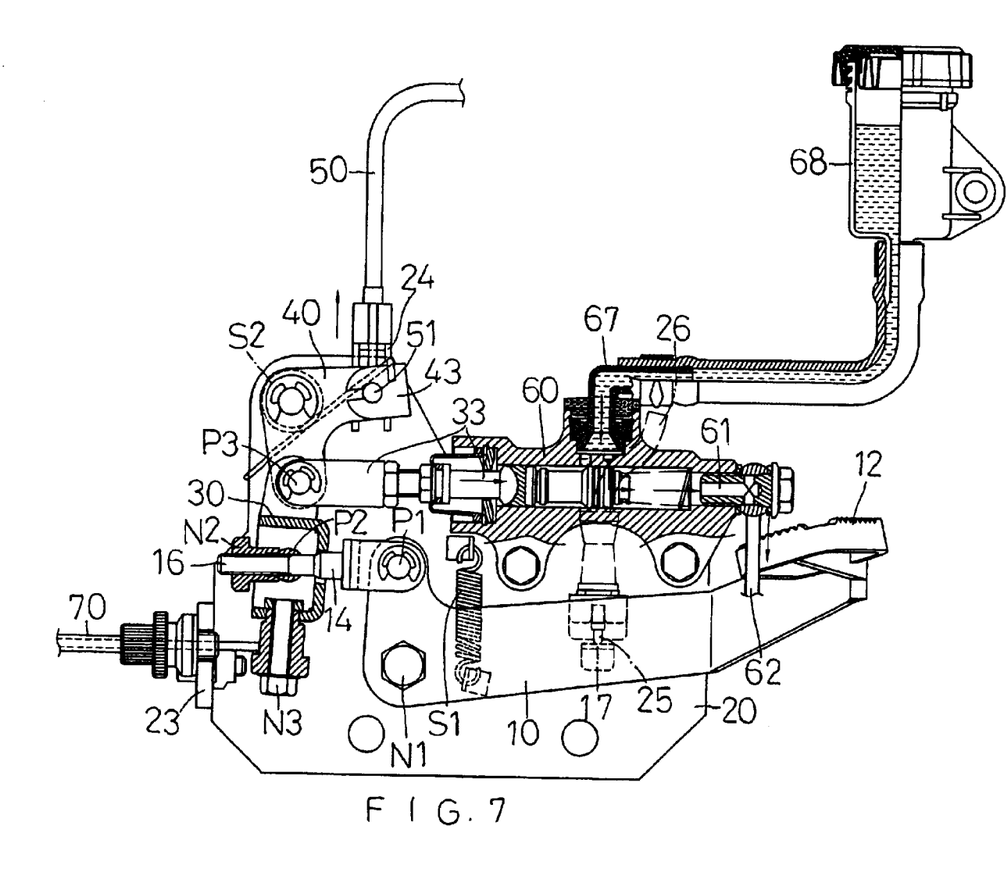
FIG. 7 is a schematic operational view of the motorized cycle as shown in FIG. 6 in use.
Figure 8:
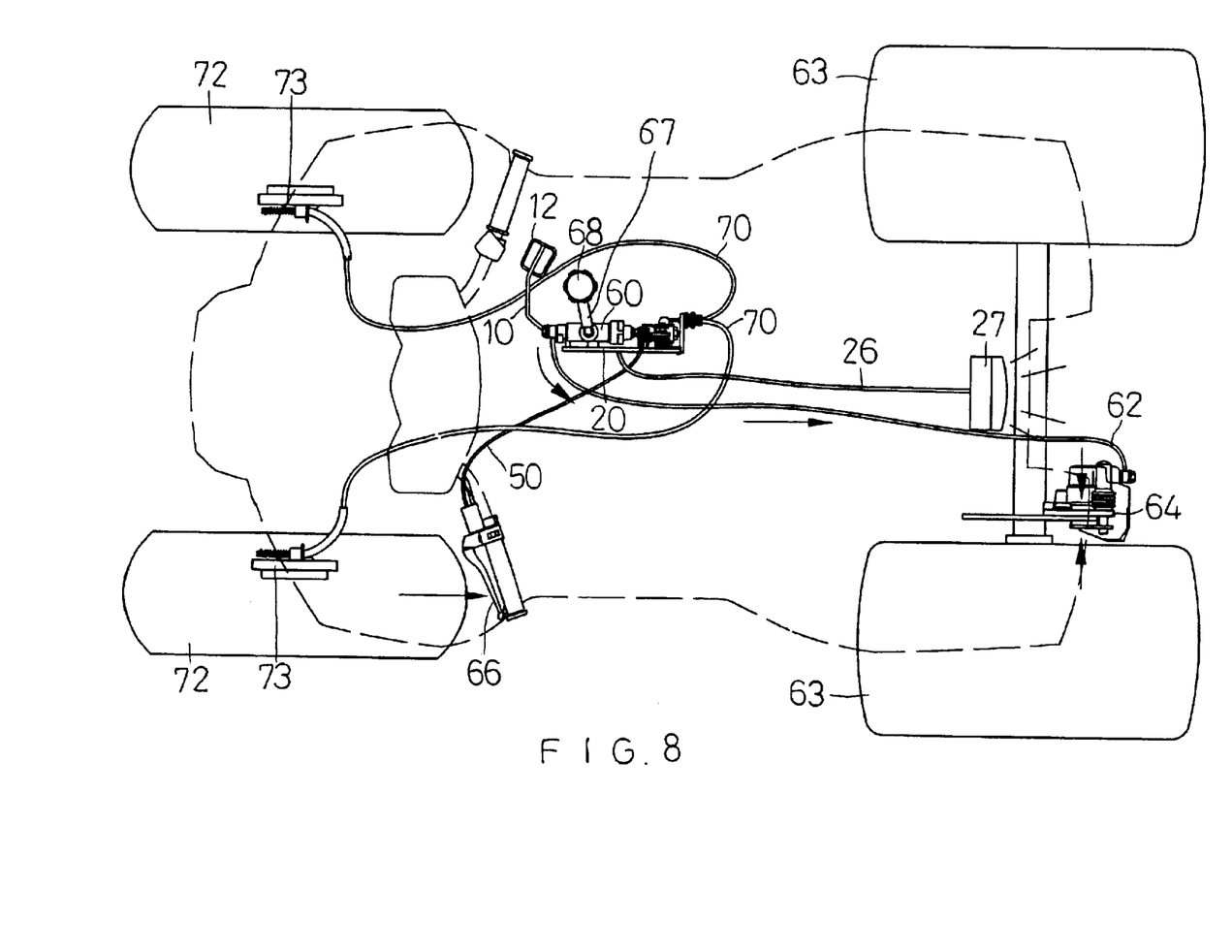
FIG. 8 is a top plan cross-sectional assembly operational view of the motorized cycle in accordance with the preferred embodiment of the present invention.

In operation, referring to FIGS. 7 and 8 with reference to FIGS. 4–6, under the normal braking operation, the left handlebar 66 is pressed by the driver to pull the rear brake wire 50, so that the second drive plate 40 and the second operation member 33 are driven and moved by the rear brake wire 50 so as to open the hydraulic oil path in the oil pump 60, such that the hydraulic oil contained in the hydraulic cylinder 68 can flow through the oil pipe 67, the to oil pump 60 and the brake oil pipe 62 to the hydraulic disk brake 64 of the rear wheel 63 so as to brake the rear wheel 63. At this time, the first drive plate 30 is moved in the opposite direction, so that the two front brake wires 70 are not pulled and moved. Thus, the two rear wheels 63 are braked independently.

Figure 9:
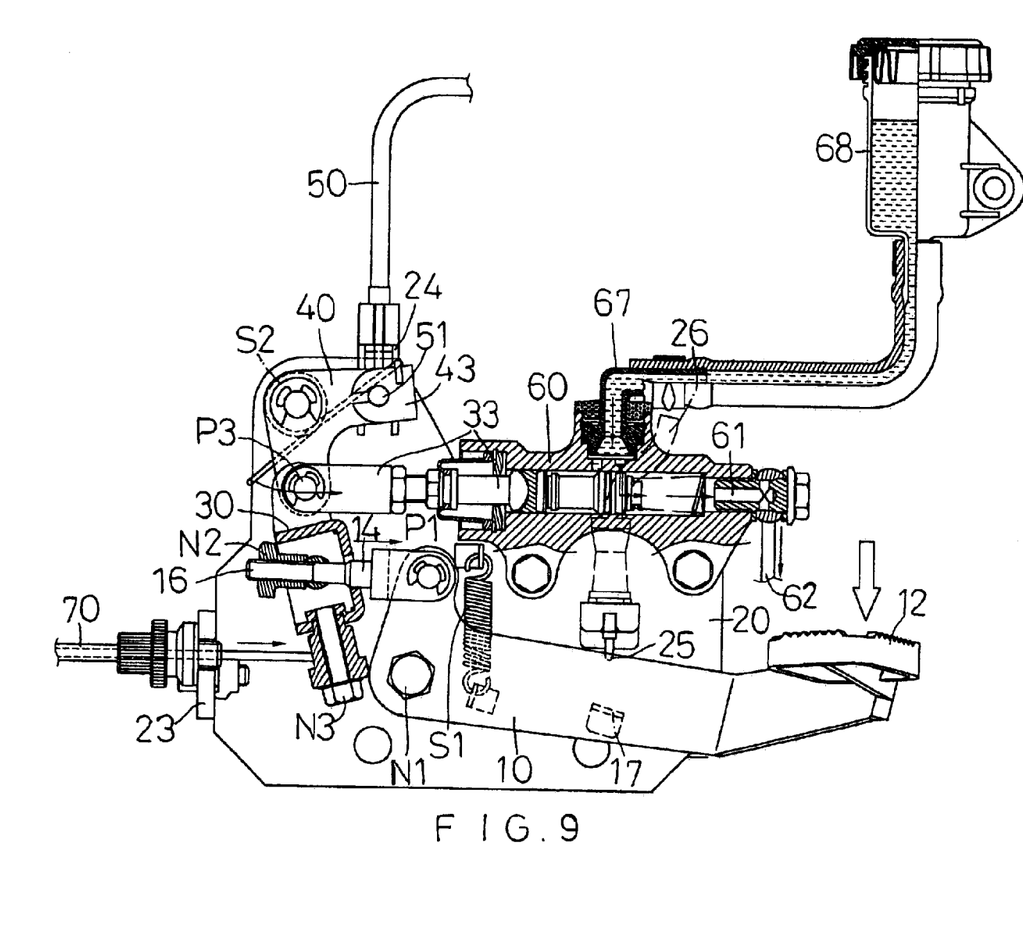
FIG. 9 is a schematic operational view of the motorized cycle as shown in FIG. 6 in use.
Figure 10:
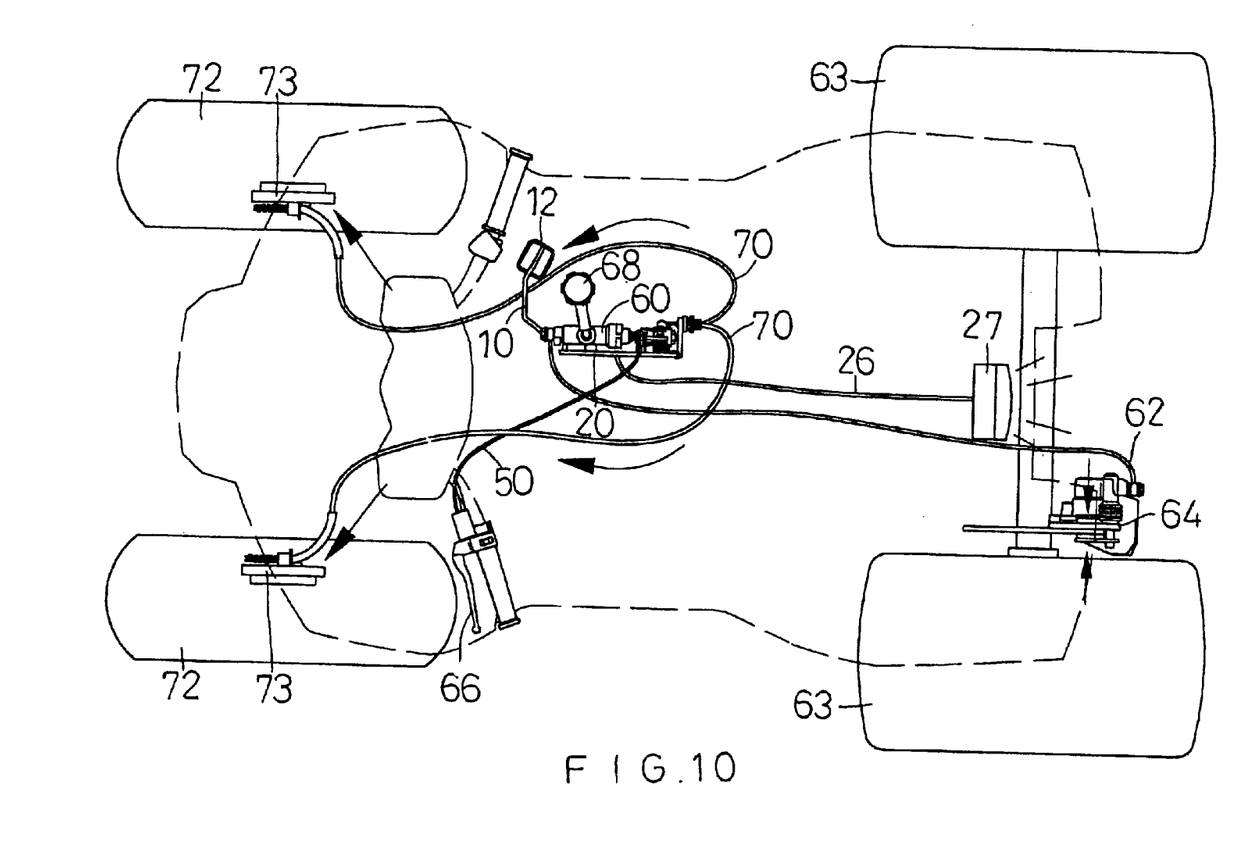
FIG. 10 is a schematic operational view of the motorized cycle as shown in FIG. 8 in use.

Referring to FIGS. 9 and 10 with reference to FIGS. 4–6, under the emergency braking operation, the pedal 12 of the brake crank 10 is stepped by the driver to move the first operation member 14 which drives the first drive plate 30 and the second drive plate 40 to move in the same direction, so as to control the two front brakes 73 to brake the two front wheels 72 and to control the hydraulic disk brake 64 to brake the two rear wheels 63, so that the four wheels can be braked synchronously.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A motorized cycle, comprising:
   a base board provided with a first pivot post and a second pivot post;
   a brake crank having a mediate portion pivotally mounted on the first pivot post of the base board;
   a first operation member pivotally mounted on the brake crank;
   a first drive plate pivotally mounted on the first operation member;
   two front brake wires each having a first end connected to a front brake and a second end secured on the first drive plate;
   an oil pump mounted on the base board and having a first end and a second end;
   the second end of the oil pump being provided with a brake oil pipe which is extended to a hydraulic disk brake of a rear wheel;
   a second operation member having a first end pivotally mounted on the first drive plate and a second end mounted in the first end of the oil pump to open and close an oil path of the oil pump;
   a second drive plate combined with the first drive plate and the second operation member and having a first end pivotally connected with the second operation member and the first drive plate;
   the second drive plate having a mediate portion pivotally mounted on the second pivot post of the base board; and
   a rear brake wire having a first end connected to a handlebar and a second end locked on a second end of the second drive plate.

2. The motorized cycle in accordance with claim 1, wherein the left handlebar is pressed to pull the rear brake wire, so that the second drive plate and the second operation member are driven and moved by the rear brake wire so as to open the hydraulic oil path in the oil pump, such that hydraulic oil can flow through the oil pump and the brake oil pipe to the hydraulic disk brake of the rear wheel so as to brake the rear wheel.

3. The motorized cycle in accordance with claim 1, wherein the first drive plate is moved in the opposite direction, so that the two front brake wires are not pulled and moved.

4. The motorized cycle in accordance with claim 1, wherein the brake crank is pressed to move the first operation member which drives the first drive plate and the second drive plate to move in the same direction, so as to control the two front brakes to brake the two front wheels and to control the hydraulic disk brake to brake the two rear wheels, so that the four wheels are braked synchronously.

5. The motorized cycle in accordance with claim 1, wherein the second end of the second drive plate is provided with a hook portion formed with a hook hole, and the second end of the rear brake wire is provided with a locking head locked in the hook hole of the second drive plate.

6. The motorized cycle in accordance with claim 1, wherein the base board is provided with a locking plate, and the second end of the rear brake wire is extended through the second locking plate of the base board.

7. The motorized cycle in accordance with claim 1, wherein the second drive plate is substantially L-shaped.

8. The motorized cycle in accordance with claim 1, wherein the first drive plate has a fork-shaped first end formed with two pivot holes, the second operation member has a fork-shaped first end formed with two pivot holes, and the second drive plate and has a first end formed with a pivot hole pivotally connected with the two pivot holes of the second operation member and the pivot holes of the first end of the first drive plate by a pivot member.

9. The motorized cycle in accordance with claim 1, wherein the oil pump has a mediate portion provided with an oil pipe which is connected to a hydraulic cylinder.

10. The motorized cycle in accordance with claim 1, wherein the mediate portion of the second drive plate is formed with a pivot hole pivotally mounted on the second pivot post of the base board.

11. The motorized cycle in accordance with claim 1, further comprising a E-shaped snap ring snapped on an outer end of the second pivot post of the base board and rested on the mediate portion of the second drive plate.

12. The motorized cycle in accordance with claim 1, further comprising a restoring member mounted on the second pivot post of the base board and having a first end secured on the second drive plate and a second end secured on the base board, so that the second drive plate can be returned to the original position by the restoring force of the restoring member.

13. The motorized cycle in accordance with claim 1, wherein the base board is provided with a microswitch which is connected to an electric wire which is connected to a rear brake lamp, and the mediate portion of the brake crank is provided with a press plate that can be moved to touch the microswitch of the base board.

* * * * *